Dec. 6, 1932.　　　　G. SCHWAB　　　　1,890,431
HEAT TREATING APPARATUS
Filed Sept. 7, 1929　　　10 Sheets-Sheet 1
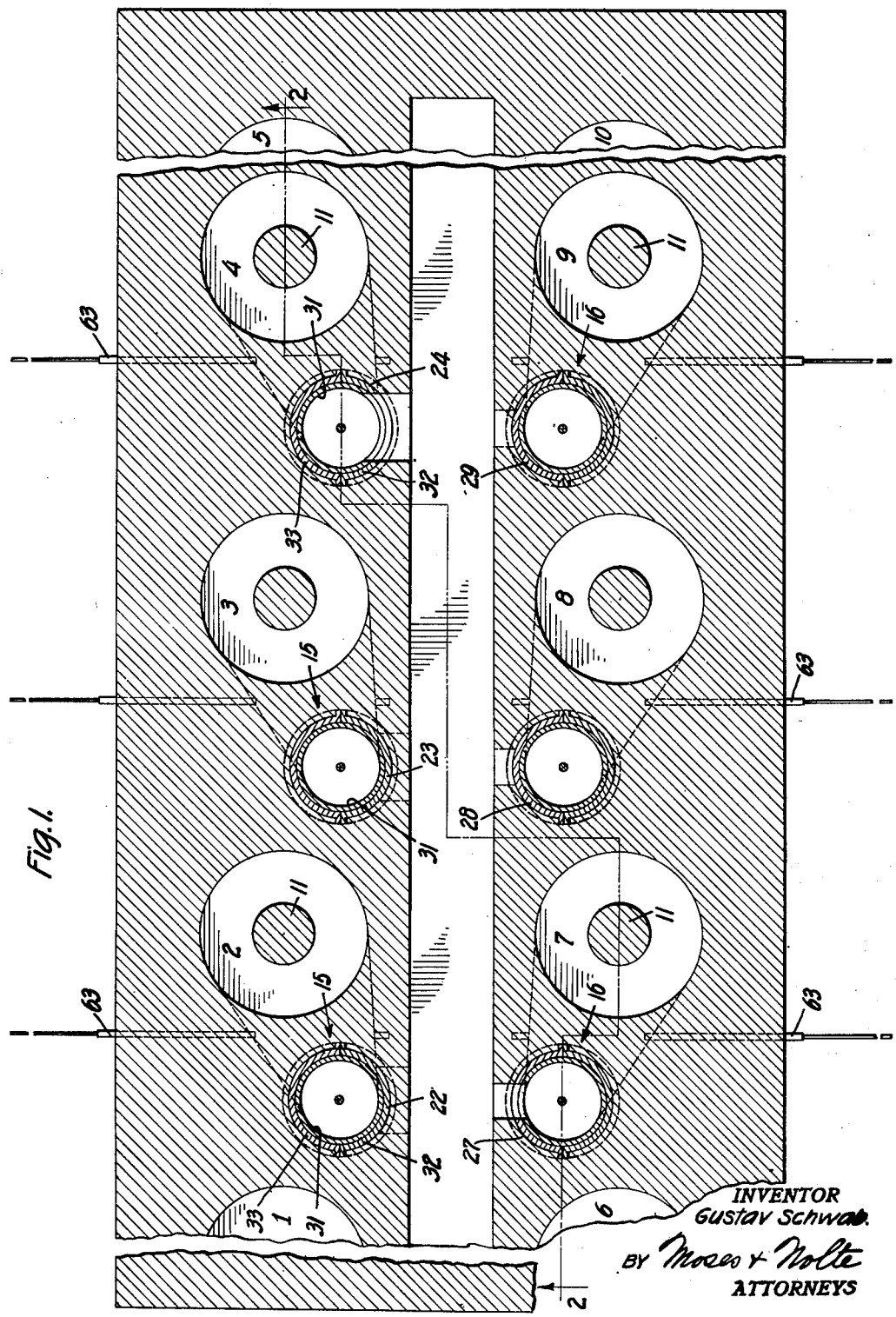
INVENTOR
Gustav Schwab.
BY Moses + Nolte
ATTORNEYS

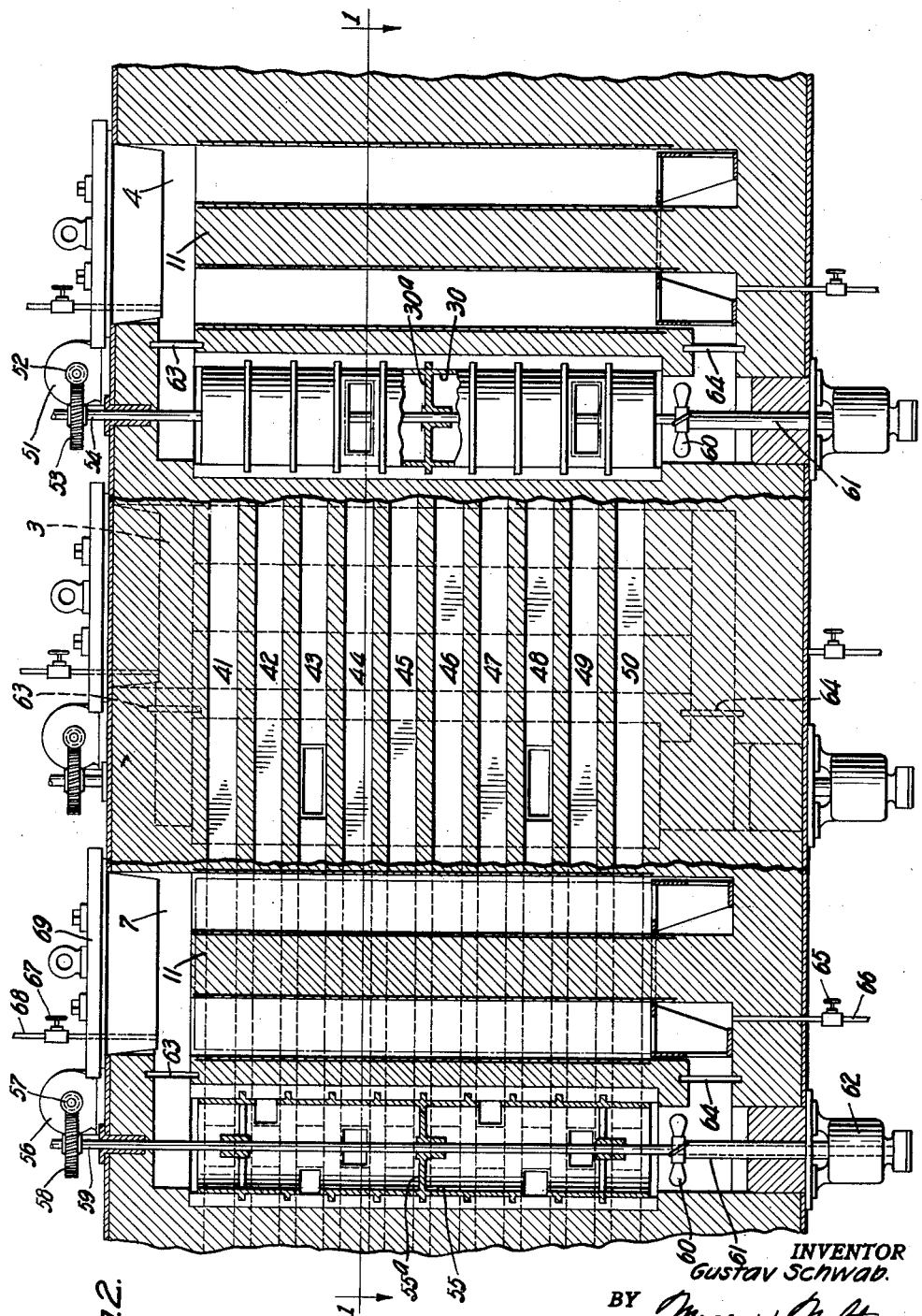

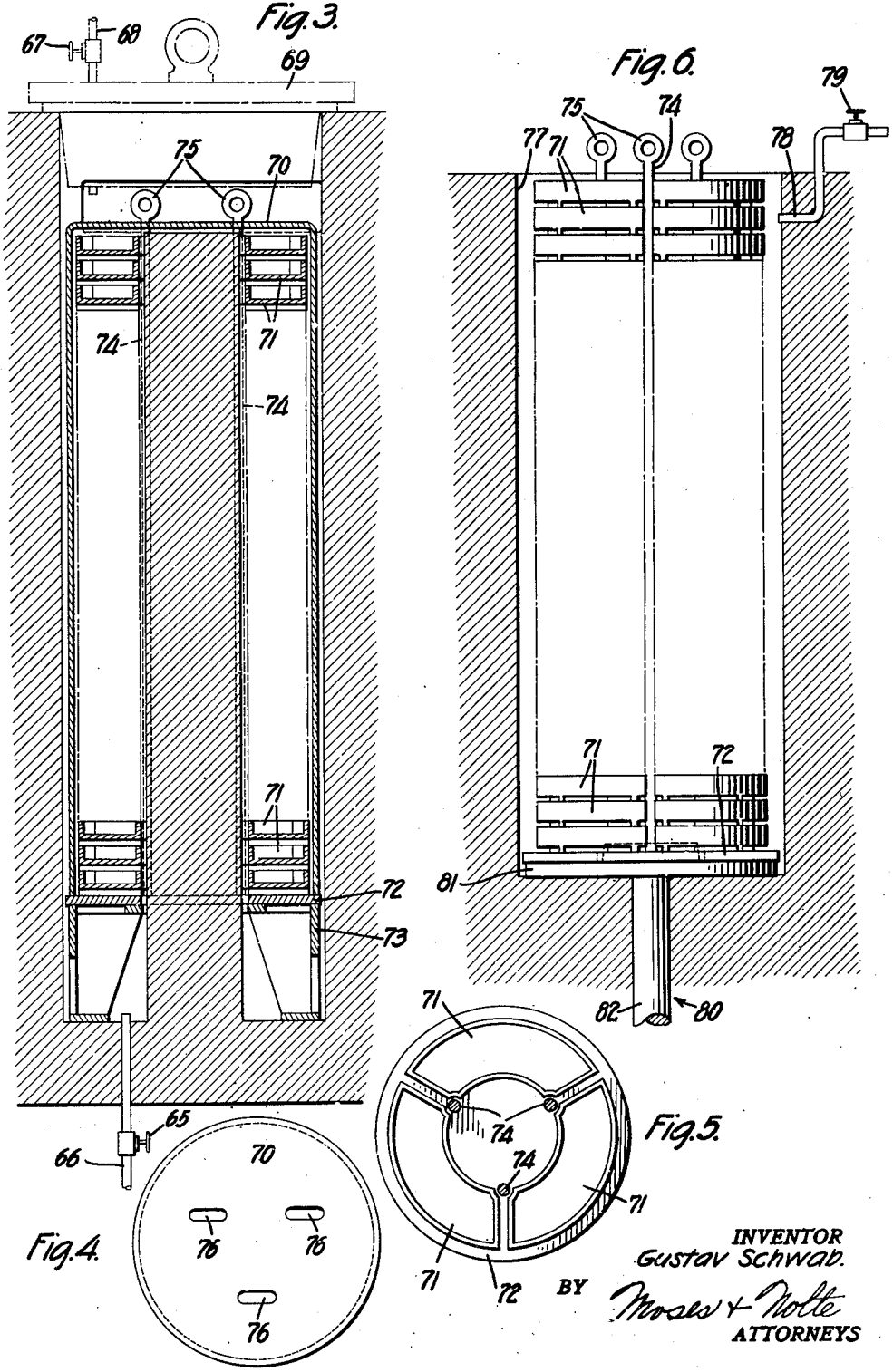

Dec. 6, 1932.   G. SCHWAB   1,890,431
HEAT TREATING APPARATUS
Filed Sept. 7, 1929   10 Sheets-Sheet 4
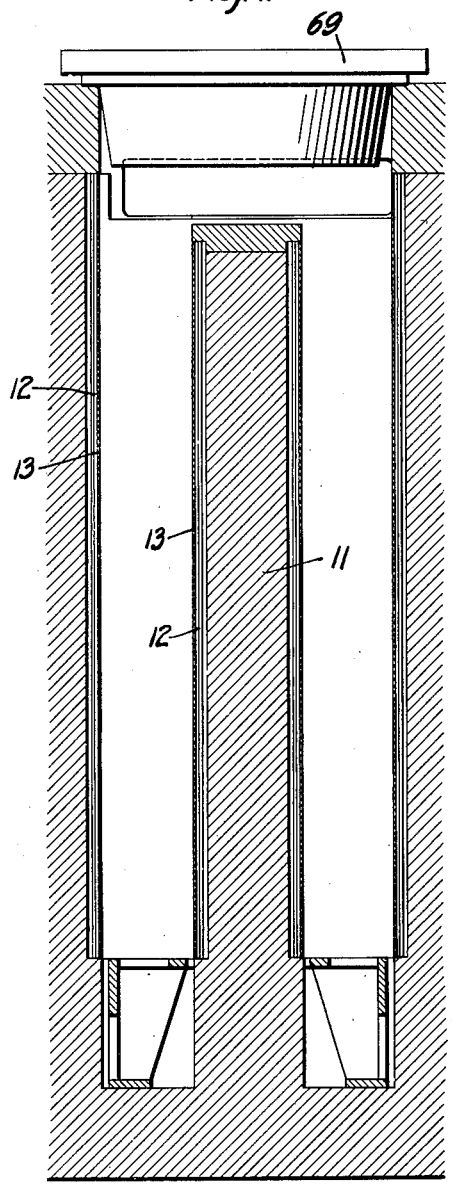
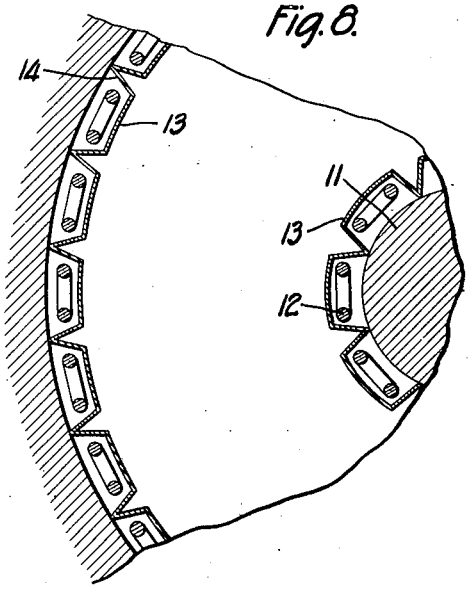
INVENTOR
Gustav Schwab.
BY
ATTORNEYS

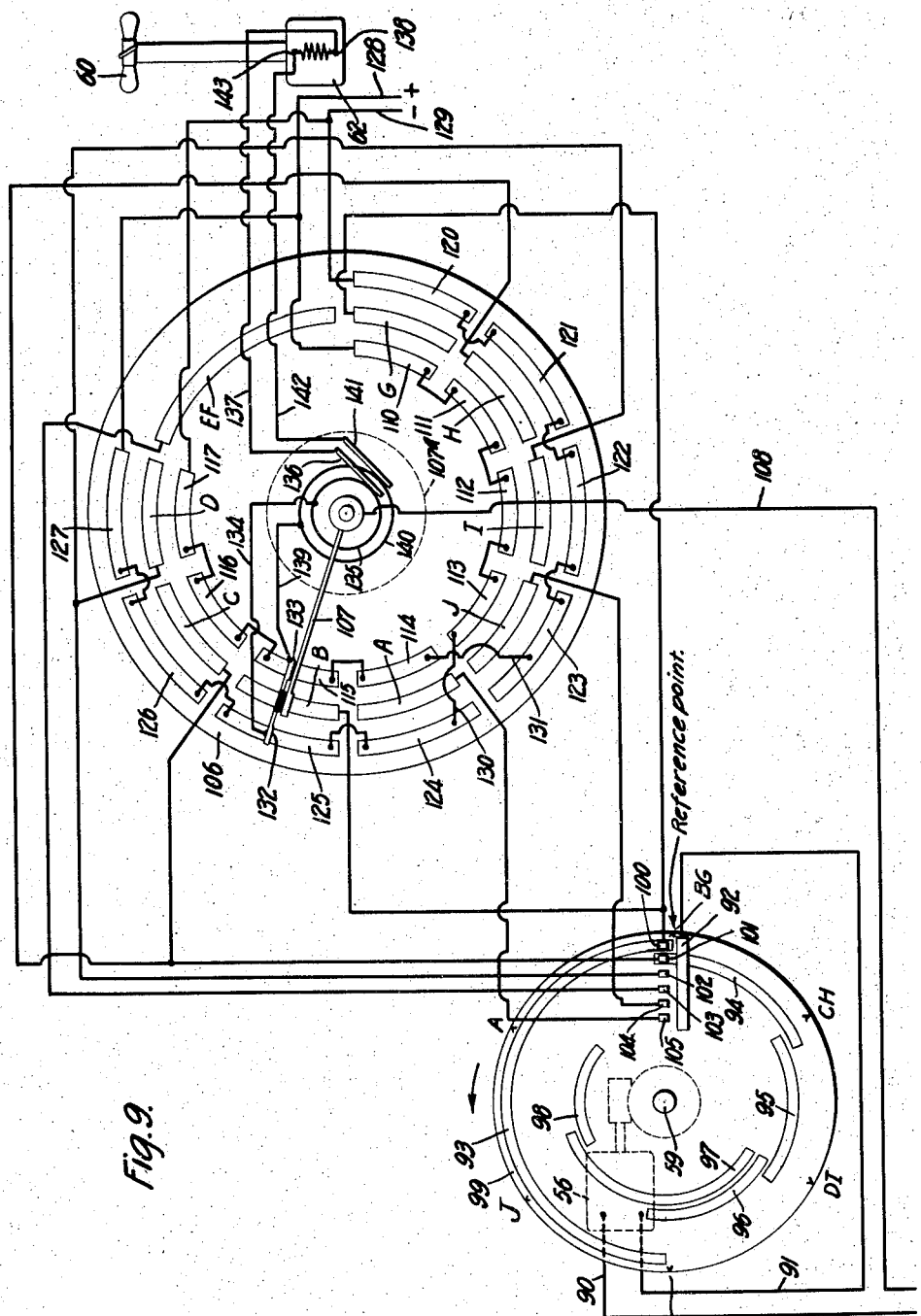

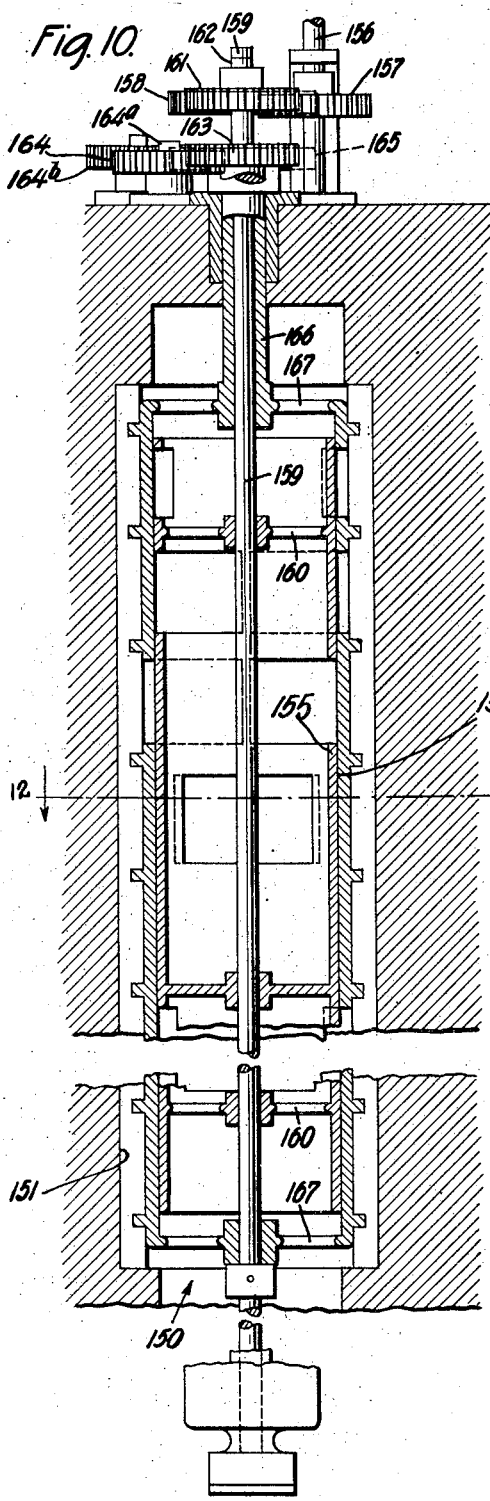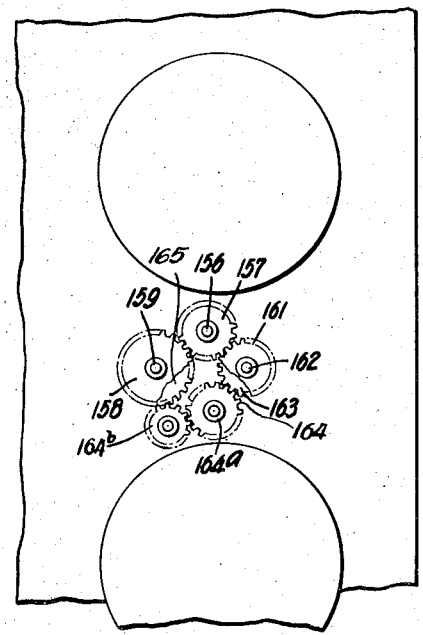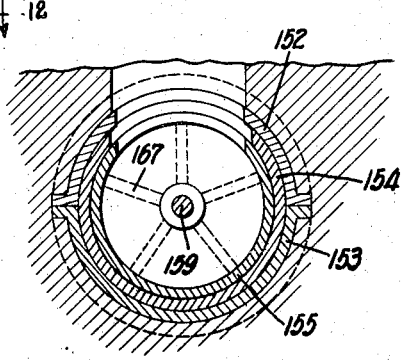

Dec. 6, 1932.   G. SCHWAB   1,890,431
HEAT TREATING APPARATUS
Filed Sept. 7, 1929   10 Sheets-Sheet 9

INVENTOR
Gustav Schwab.
BY
ATTORNEYS

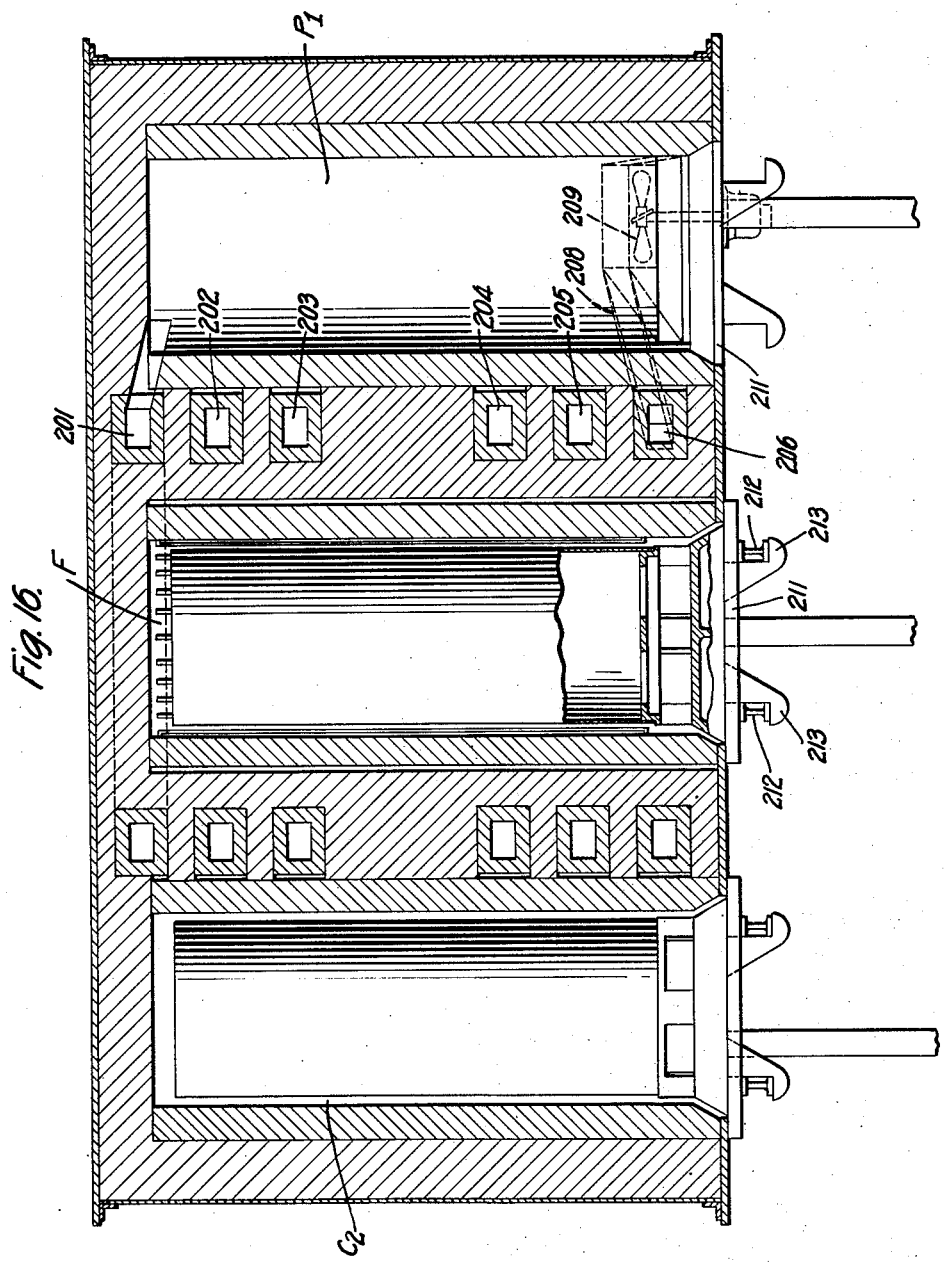

Patented Dec. 6, 1932

1,890,431

UNITED STATES PATENT OFFICE

GUSTAV SCHWAB, OF TOWNLEY-ELIZABETH, NEW JERSEY, ASSIGNOR OF ONE-THIRD TO ALBERT C. NOLTE, OF NEW YORK, N. Y.

HEAT TREATING APPARATUS

Application filed September 7, 1929. Serial No. 390,944.

This invention relates to an improvement in heating apparatus adapted to be used industrially in the heat treatment of metals and alloys, in the chemical industry, and for other purposes. The invention is primarily adapted for reduction of oxides, for nitriding or carburizing of metals, or simply for heat treatment of metals in cases where the heating specifications call for "cooling" after heating as distinguished from "quenching", after heating. The invention will, therefore, be described for illustrative purposes, with reference to such operations, although it will be appreciated that the invention is not limited to such uses, but is intended to be employed wherever its principle is applicable.

The invention permits a useful regaining or saving of the larger portion of the heat energy which has been heretofore lost in cooling, by utilizing previously heated charges which are in the course of cooling to effect successive stages of preheating of subsequent charges.

Other objects and advantages will hereinafter appear.

In the drawings forming part of this specification:

Figure 1 is a horizontal section through an apparatus embodying features of the invention taken on the line 1—1 of Figure 2;

Figure 2 is a vertical, fragmentary section of the apparatus disclosed in Fig. 1 taken on the line 2—2 of Fig. 1, looking in the direction of the arrows;

Figure 3 is a vertical, sectional view through one of the retorts of Fig. 1, and shows means adapted to be employed in conjunction therewith for removing the work without exposing it to oxidation by the atmosphere;

Figure 4 is a plan view of the hood member of Fig. 3 which is utilized for protecting the work from exposure to the atmosphere;

Figure 5 is a plan view of the rack construction employed in Fig. 3;

Figure 6 is a sectional elevation of a discharge pit or chamber to which the work may be transferred after it has been removed from the retort of Fig. 3;

Figure 7 is a sectional elevation showing a detail of the retort or furnace construction;

Figure 8 is a fragmentary, horizontal, sectional view of the retort or furnace of Fig. 7 on a larger scale than Fig. 7;

Figure 9 is a diagrammatic plan view of the valve controlling and operating mechanism;

Figure 10 is a fragmentary, sectional view through a single valve mechanism of somewhat different construction from the valve mechanism illustrated in Figs. 1 and 2;

Figure 11 is a fragmentary, detail, plan view of the gearing for driving the valve mechanism of Fig. 10;

Figure 12 is a horizontal, sectional view through the valve mechanism of Fig. 10, taken on the line 12—12 of Fig. 10;

Figure 16 is a vertical section taken on the line 16—16 through the apparatus of Fig. 15.

Figure 13:
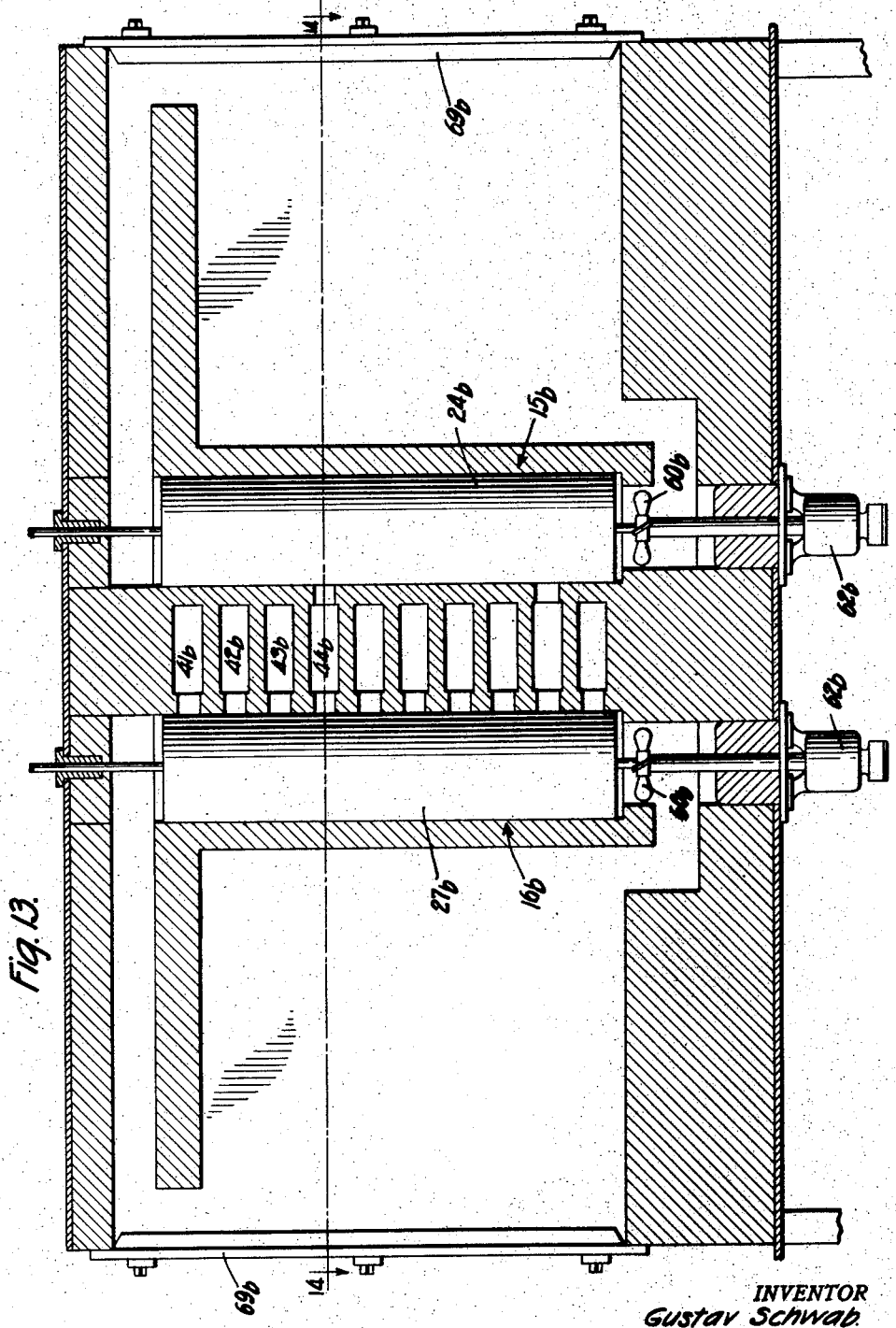
Figure 13 is a transverse vertical section through a modified form of apparatus, taken on line 13—13 of Fig. 14.

While the principle of the present invention may be employed to advantage in operations involving varying numbers of stages of treatment of the work being acted upon, it has been illustrated herein as applied to the heat treatment of steel in which the cycle comprises the following ten stages:

A—First pre-heating stage.
B—Second pre-heating stage.
C—Third pre-heating stage.
D—Fourth pre-heating stage.
E—Furnace heating stage (in which the maximum temperature is attained by supplying heat from an extraneous source as by means of electrical heating elements).
F—Slow cooling stage (in which the charge is allowed to cool slowly without giving off heat to any other charge).
G—First cooling exchange stage.
H—Second cooling exchange stage.
I—Third cooling exchange stage.
J—Fourth cooling exchange stage.

For the purpose of subjecting the work material to the above stages of treatment there are provided ten retorts numbered 1 to 10, inclusive, arranged in two parallel banks or rows, the retorts of the first bank being numbered 1 to 5, and the retorts of the second bank being numbered 6 to 10.

The ensuing description will be made clearer if the way in which these retorts are used is made clear at the present point, and the description of the actual physical structure whereby the desired results are attained is deferred. While the stages of treatment need not be of equal duration and may be varied as required for a particular process, the common usage of the invention will probably call for stages of treatment of equal duration. The functioning of the apparatus is therefore described, dealing with stages of treatment of equal duration, so that the change from one stage to the next occurs simultaneously in every one of the ten retorts. Provision is made for selectively placing the retorts in communication with one another, so that the heat given off from the cooling charge in one may be transferred to effect a pre-heating stage of the heating charge in another. While it is perfectly permissible and practical, to shut one or more retorts off either for repairs or for reasons of reduced production requirements, and to then operate the balance of the retorts in a similar way as described, reducing thereby of course the number of available heat exchange cycles by one cycle for each one or two retorts thus remaining idle, the invention is described in the following as if at any given time every one of the retorts is in communication with one of the others except the retorts which happen at the selected time to be at the furnace heating stage and at the slow cooling stage. In other words, the retorts at stages E and F are shut off from any other portion of the system. The connections effected are always as follows:

The retort which is at stage G is connected to deliver heat to the retort which is at stage D;

The retort which is at stage H is connected to deliver heat to the retort which is at stage C;

The retort which is at stage I is connected to deliver heat to the retort which is at stage B; and The retort which is at stage J is connected to deliver heat to the retort which is at stage A.

In each of the retorts, however, the full cycle is carried out, the charge being subjected to the ten stages of the cycle successively without the necessity of shifting the charge from one retort to another. Since the operation is continuous, it is unnecessary to describe the starting of the apparatus into operation other than to say that at a time when no previously heated charges are present for effecting the pre-heating in accordance with the intended cycle, such pre-heating may be accomplished by the furnace heating means illustrated herein as electrical heating elements, each retort being provided with heating means of this character.

Considering that the apparatus is in continuous operation, examination of it may be considered as occurring when the various retorts as numbered in the drawing are at the respective stages indicated under "first period" in the following list:

CHART A.

| STAGES | 1st period | 2nd period | 3rd period | 4th period | 5th period | 6th period | 7th period | 8th period | 9th period | 10th period | 1st period |
|---|---|---|---|---|---|---|---|---|---|---|---|
| A | 3 | 7 | 4 | 9 | 2 | 10 | 1 | 6 | 5 | 8 | 3 |
| B | 8 | 3 | 7 | 4 | 9 | 2 | 10 | 1 | 6 | 5 | 8 |
| C | 5 | 8 | 3 | 7 | 4 | 9 | 2 | 10 | 1 | 6 | 5 |
| D | 6 | 5 | 8 | 3 | 7 | 4 | 9 | 2 | 10 | 1 | 6 |
| E | 1 | 6 | 5 | 8 | 3 | 7 | 4 | 9 | 2 | 10 | 1 |
| F | 10 | 1 | 6 | 5 | 8 | 3 | 7 | 4 | 9 | 2 | 10 |
| G | 2 | 10 | 1 | 6 | 5 | 8 | 3 | 7 | 4 | 9 | 2 |
| H | 9 | 2 | 10 | 1 | 6 | 5 | 8 | 3 | 7 | 4 | 9 |
| I | 4 | 9 | 2 | 10 | 1 | 6 | 5 | 8 | 3 | 7 | 4 |
| J | 7 | 4 | 9 | 2 | 10 | 1 | 6 | 5 | 8 | 3 | 7 |

It will be noted from an inspection of the above list that the various retorts follow one another in the order enumerated through the various stages of the cycle. Each retort is discharged at the conclusion of stage J and recharged with a fresh supply of material for the beginning of stage A.

It will be noted that two retorts of the same bank or row are never charged successively, but that retorts of one row occur alternately with retorts of the other throughout the list. This sequence is selected for the reason that it enables an economical and simple system of effecting the necessary interconnection of retorts to be effected. Having in mind that communication is established between the retorts at stages G and D, the retorts at stages H and C, the retorts at stages I and B, and the retorts at stages J and A, it will be noted from an inspection of the above chart that no retort is ever connected to another retort of the bank in which it is situated, but that each retort must be adapted for connection at one time or another to every one of the retorts of the opposite bank. This arrangement enables a relatively simple method of inter-connection to be practiced.

Referring now to the drawings more in detail, it will be noted that each retort is cylindrical in form, and each desirably has a cylindrical core piece 11 so that an annular chamber is provided for receiving the work. Electrical heating elements 12 (Fig. 8) are positioned adjacent the periphery of the retort and adjacent the core piece of the retort. These electrical heating elements are desirably protected from oxidation, destruction or interference by cover plates 13 which are trapezoidal in form. Each cover plate 13 comprises diverging legs 14 adapted to abut at the base with similar legs of adjoining cover plates and to be welded to them. The cover plates are thus arranged each to occupy a short arc and with intervening notches or gaps between them. The cover plates are thus adapted to expand without permanent distortion and without substantial strain when heated by the electrical heating elements.

The protective cover plates are of especial importance in operations, such as gas carburizing, in which gases are employed which would cause the formation of deposits on the resistor elements detrimentally affecting the resistance characteristics if the elements were unprotected. In other cases, however, the cover plates are preferably omitted. The core pieces 11 are also preferably omitted except in relatively large apparatus.

Associated with each of the retorts 1 to 5 is a valve mechanism 15 (see Figs. 1 and 2) adapted to control the placing of the retort in communication with retorts of the opposite bank. Each of the retorts 6 to 10 has associated with it a valve mechanism 16 to be employed in placing it in communication with the retorts of the opposite bank to that in which it is situated. The valves 15 are located in cylinders 21 to 25 which communicate at the upper and lower ends thereof with the upper and lower ends of retorts 1 to 5; and the valves 16 are located in cylinders 26 to 30 which communicate at their upper and lower ends with the retorts 6 to 10. (See Figure 2.) Each of the valves 15 comprises an inner cylindrical sleeve 31 adapted to be rotated, and a casing composed of semi-cylindrical sections 32 and 33. Each of the valve casings of the valves 15 is provided with two openings or ports for communicating with two of ten flues 41 to 50, inclusive, which extend horizontally across the space intervening between the valves 15 and 16. Thus the valve casing of the valve associated with retort 4 is shown in Fig. 2 as communicating with flues 44 and 49. Similarly, the casing associated with retort 1 is adapted for communication with flues 41 and 46, that associated with retort 2 is adapted for communication with flues 42 and 47, that associated with retort 3 is adapted for communication with flues 43 and 48. and that associated with retort 5 is adapted for communication with flues 45 and 50.

The valve sleeve 30 associated with retort 4 is provided with openings therein adapted to place the interior of the sleeve, and hence the retort 4, in communication with the flues 44 and 49 or to shut the interior of the sleeve off from communication with such flues. The sleeve 30 is operated by a motor 51 which, through a worm 52 and worm wheel 53, rotates the shaft 54 of the sleeve 30. The motor 51 is clock-controlled. Since it is desired that the sleeve 30 be in communication with the flues 44 and 49 through eight consecutive stages and then be closed off from the flues during the other two consecutive stages, the time mechanism might be arranged to operate each valve sleeve 30 through one-tenth of a revolution at the conclusion of every stage or through one-fifth of a revolution at the conclusion of alternate stages. Either arrangement is permissible, but it is preferred, in order to utilize larger valve openings, to operate each valve through approximately 180° at each operation, and to effect such operations only at the beginning of the furnace heating stage and at the conclusion of the slow cooling stage. The means for operating the valve in this manner will be made clear in connection with the description of Fig. 9.

The valve sleeve 30 associated with retort 4 is provided with a central partition 30a so that the gas leaving one end, say the top of retort 4, will have to make a complete circuit through the flue 44, then through the connected retort of the opposite bank, and return through flue 49 to re-enter the retort 4 at the lower end thereof.

The valve sleeves 30 associated with the retorts 1, 2, 3 and 5 are similar in every respect to the sleeve 30 just described as associated with retort 4 with the single exception that the openings in the sleeves are located at other levels so that each retort is adapted to be placed in communication with the flues hereinbefore indicated and no others.

The valves 16 differ in construction from the valves 15 in that the outer sleeves of valves 16 have openings leading into all ten of the flues 41 to 50, and the inner sleeves 55 have openings at different levels adapted to be brought selectively by rotation of the inner sleeves into and out of registration with the openings in the outer sleeves. Each of these valve openings occupies about one-sixth of the circumference of the sleeve.

Each valve sleeve 55 is provided with a central partition 55a for the same reason that a partition 30a is provided in each valve sleeve 30.

Each valve sleeve 55 is driven by a motor 56 through a worm 57 and a worm gear 58 connected to the shaft 59 of the valve sleeve 55. The motors 56 are controlled by clockwork to rotate their respective associated valve sleeves automatically as required. The valve controlling and operating mechanism will be described in detail in connection with Fig. 9.

At the lower end of each valve sleeve 55 and of each valve sleeve 30 provision is made of a blower 60. Each blower 60 is carried by a rotatable sleeve 61 which surrounds the lower end of the associated valve shaft, and is connected to be driven by a reversible, variable speed, motor 62 located beneath the body of the apparatus. These blowers may be set into operation in either direction as desired to induce a circulation of air or other gaseous heat transferring medium through connected retorts to accelerate the rate of heat interchange as desired.

For ordinary heat treatment in which no particular protection against oxidation is required, air may be utilized as the heat transferring medium. If the operation to be performed is of such nature that it is desirable that hydrogen be employed, the apparatus is filled with hydrogen. Such an operation would be, for example, the reduction of iron oxide to metallic iron. The end product is in powdered form and is highly pyrophoric. In this case great care must be exercised to prevent the escape of the hydrogen or the mixture of it with the air, so that there may be no danger of an explosion, and also to prevent contact of the powdered iron with the air before the iron has been wetted down. For the purpose of enabling proper precautionary measures to be taken under these conditions, each retort is provided with a manually operable slide valve 63 at the upper end thereof, and with a similar valve 64 at the lower end thereof for cutting off the retort from its associated valve mechanism, and hence from all of the rest of the circulating system. After the final practical heat exchange has been accomplished, slide valves —63— and —64— are closed, that is, the respective chamber is entirely cut off from the remaining chamber system. The reduction process would now commence, hydrogen flow through the chamber being accomplished through conduits 66 and 68, controlled by valves 65 and 67. After the completed reduction, slide valves 63 and 64 would again be opened and the chamber with its reduced charge would be switched into successive heat-exchange, giving off its sensible heat, with other preheating charges. After thus having brought the cooling charge to a temperture, representing the practical, most rational limit of heat-exchainge for the process involved, slide valves 63 and 64 would again be closed and the cooling of the reduced charge continued to the required degree. In order to accomplish this final cooling as rapidly as possible, and at the same time change the chamber atmosphere to a "safe" atmosphere, this final cooling may be done with carbon dioxide gas, if necessary refrigerated. After the work has thus been cooled to a temperature of about 200° F., the cover 69 is removed and a hood or cap member 70 is inserted to cover all of the work to prevent contact of the air with the work during the period of transfer of the charge to the discharge pit 77. The work is held in segmental trays 71 arranged in tiers upon a support 72 adapted to rest upon a hollow base or pedestal 73 in the bottom of the retort. The support 72 is provided with vertical arms 74 of which there are preferably three or more. These arms extend upward from the support to a point above the highest tier of trays carried by the support and have eyes 75 at their upper ends adapted to receive hooks of a lifting device so that the support, with all the trays and the hood 70, may be lifted out of the retort together. The hood 70 is provided with openings 76 in the top thereof to permit the eyes 75 to be projected through the top of the hood and to be accessible to the lifting means. The openings 76 also permit escape of air from the hood and hence permit the air in the hood to be completely driven out of the hood by carbon dioxide as the hood is lowered into the retort. The work removed from the retort is then transferred to a discharge pit 77 (see Fig. 6) which is kept filled with carbon dioxide through a pipe 78, the delivery of carbon dioxide being controlled by a valve 79. The top of the pit may be open without danger of objectionably exposing the work pieces to the air, for the reason that carbon dioxide is heavier than the air. The support 72 is lifted, step by step, by means of a hydraulic or pneumatic lift 80. This lift comprises a platform 81 located in the bottom of the pit 77 and a plunger 82 adapted to be raised by the hydraulic or pneumatic lifting apparatus. The work is thus elevated step by step to bring one tier at a time above the top of the pit and the trays of each tier are removed as they arrive in position. Where the work is pyrophoric substance such as metallic iron powder, the work is wetted down immediately after each tray is removed from the fixture. When the work is not pyrophoric the use of the discharge pit and the hood is unnecessary as the work may be safely exposed to the atmosphere at the conclusion of the last cooling stage, or if a further cooling be essential beyond the degree reached in the last practical cooling cycle, such further cooling could be rapidly accomplished by circulating, if necessary, refrigerated hydrogen or a cooled "inert" gas through the chamber, of course with slide valves 63 and 64 closed.

When the apparatus is used for any operation involving the employment of a treating gas, such, for example, as carburizing, nitriding, reducing, etc., the connections 65, 66, 67, and 68 may be employed as desired for the introduction or the removal of the treating gas.

The controlling mechanisms for the valves associated with retorts 6 to 10 are similar to one another but for the purpose of this description it may be assumed that the controlling mechanism illustrated in Fig. 9 is that associated with retort 7. At the point in the cycle selected for illustration, retort 7 is at stage B, the second preheating stage, and hence is coupled in heat interchanging relation with retort 2, the period being the third period indicated in Chart A.

For the purpose of making clear just what is required of this controlling mechanism, it is desirable to have clearly in mind just what connections are required to be effected with each of the chambers 6 to 10. An examination of Chart A shows these connections to be the following, X being used to indicate that a chamber is shut off altogether from communication with all other chambers:

Chart B

| Chamber No. | 1st period | 2nd period | 3rd period | 4th period | 5th period | 6th period | 7th period | 8th period | 9th period | 10th period |
|---|---|---|---|---|---|---|---|---|---|---|
| 6 | 2 | X | X | 3 | 4 | 2 | 1 | 5 | 3 | 4 |
| 7 | 3 | 4 | 2 | 1 | 5 | X | X | 4 | 2 | 1 |
| 8 | 4 | 2 | 1 | X | X | 4 | 2 | 1 | 5 | 3 |
| 9 | 5 | 3 | 4 | 2 | 1 | 5 | 3 | X | X | 1 |
| 10 | X | 5 | 3 | 4 | 2 | 1 | 5 | 3 | 4 | X |

It is apparent from the above table that each of the valves has six different positions to fill in the cycle as follows:

Valve for chamber 6: X—3—4—2—1—5, 3, 4, 2 occurring twice
Valve for chamber 7: X—2—1—5—3—4, 2, 1, 5 occurring twice
Valve for chamber 8: X—4—2—1—5—3, 4, 2, 1 occurring twice
Valve for chamber 9: X—1—5—3—4—2, 1, 5, 3 occurring twice
Valve for chamber 10: X—5—3—4—2—1, 5, 3, 4 occurring twice Motor 56 for operating the valve 16 is connected to a conductor 90, which conductor is connected to one terminal of a source of operating current. The other terminal of the motor 56 is connected through a conductor 91 with a contact plate 92. The contact plate 92 is adapted to be electrically connected selectively to contact strips 93, 94, 95, 96, 97 and 98, carried by a disk 99 fast on the valve shaft 59, with contacts 100, 101, 102, 103, 104 and 105. By reason of the provision of the contact plate 92, contact strips 93 to 98, inclusive, and contacts 100 to 105, inclusive, actuation of the valve is made dependent upon the position which the valve itself occupies. Provision is further made for making actuation of the valve dependent upon the position occupied by clock operated mechanism so that actuation may be effected automatically at appropriate times. For this purpose provision is made of a disk 106 over which a wiper arm 107 is operated in a clockwise direction by suitable clock 107ª for conducting the current through conductor 108 to the opposite terminal of the source of current from that to which conductor 90 is connected. Provision is also made on the disk 106 of acuate contact plates A, B, C, D, EF, G, H, I, and J. The designations given to the strips correspond with the stages of the cycle which occur during the time that the wiper arm 107 is run in engagement with them. Each of the contact arcs A, B, C, D, G, H, I, J, is a little less than 36 degrees in extent while the contact EF is a little less than 72 degrees in extent. Contact 100 is permanently connected to contacts B and G; contact 101 is permanently connected to contacts C and H; contact 102 is permanently connected to contacts D and I; contact 103 is permanently connected to contact EF; contact 104 is permanently connected to contact J; and contact 105 is permanently connected to contact A. It will be noted that contacts 93 to 98 are concentric with the axis of shaft 59, but that they are of progressively diminishing radius. Besides provision for overlap, contacts 94, 95, 96 and 98 are each approximately 60 degrees in extent, contact 97 is 120 degrees in extent, and contact 93 is 180 degrees in extent.

In the position shown in Figure 9, the circuit for the last previous operation of the valve has been completed through contacts 92, 93, 100 and B. While the wiper is still in engagement with contact B, rotation of the valve has been arrested by reason of the fact that the contact 93 has moved to a position where it no longer bridges the gap between contacts 92 and 100. The contact 94 has been brought into position to bridge the gap between contacts 92 and 101 but no rotation of the valve takes place at this time for the reason that connection of the contact 101 cannot be made to the source of current through contact B. As soon as the wiper 107 engages contact C (which will be at the conclusion of stage B and the beginning of stage C) the circuit to the motor 56 will be completed and the motor will operate to rotate valve 16 and also disk 99 through 60 degrees in a counter-clockwise direction. Rotation will be arrested by movement of contact 94 clear of contact 92. The valve and the disk 99 will then remain in this position throughout stage C at the end of which stage contacts D and 95 will be simultaneously effective to advance the valve sixty degrees.

The principle of operation is believed to be sufficiently indicated by the above description so that a description of the complete cycle in detail is unnecessary. Examination of the mechanism disclosed will show that the valve is operated to the following extent at the conclusion of the stages indicated:

| Conclusion of stage | Degrees |
|---|---|
| B | 60 |
| C | 60 |
| D | 60 |
| E | 0 |
| F | 180 |
| G | 60 |
| H | 60 |
| I | 120 |
| J | 60 |
| A | 60 |

This brings the points marked on the valve opposite the arrow marked "Reference point" as follows: CH, DI, EF, EF, BG, CH, DI, J, A. BG. This is obviously the sequence of operations desired and represents rotation of the valve through 720 degrees so that at the end of the cycle the valve occupies its original position and is ready for a repetition of the cycle.

Disclosure is also made in Figure 9 of mechanism for controlling the operation of the fan motor 62 associated with chamber 7, this mechanism being also illustrative of the mechanism employed for operating the fans associated with all of the chambers 1 to 10.

The motor 62 is desired to induce a downdraft in the valve associated with chamber 7 during stages A, B, C, and D, to be idle during stages E and F, and to induce an updraft during stages G, H, I and J. In other words, it is ordinarily desired to rotate the fan in the direction to assist the flow of air induced by thermo-siphon action in the chamber of a connected pair which is relinquishing heat to the other. Provision is made, however, for interrupting the operation of the fans for short intervals between successive stages of the cycle. With these ends in view provision is made on the disk 106 of an inner series of arcuate contact strips 110, 111, 112, 113, 114, 115, 116 and 117 and of an outer series of arcuate contact strips 120, 121, 122, 123, 124, 125, 126 and 127. Conductors 128 and 129 form connections respectively between one terminal of a source of current and contact strip 110, and between the opposite terminal of the source of current and contact strip 120. Contact strips 110, 111, 112 and 113 are connected in series with one another and through a conductor 130 are connected in series with contact strips 124, 125, 126 and 127. Contact strips 120, 121, 122 and 123 are connected in series with one another and through a conductor 131 are connected in series with contact strips 114, 115, 116 and 117. The wiper arm 107 carries a pair of wipers 132 and 133 insulated from it and from one another and adapted to run respectively in engagement with the outer and inner series of arcuate contact strips on the disk 106. Contact 132 is connected through a conductor 134 with an insulated conductor ring 135 rotatable with wiper arm 107, and this conductor ring 135 is in turn connected through a brush 136 and conductor 137 with one terminal 138 of the field of motor 62. Wiper 133 is connected through a conductor 139 with an insulated conductive ring 140 rotatable with the wiper 107, and this ring in turn is connected through a brush 141 and a conductor 142 with the opposite terminal 143 of the field of the motor 62. The armature connections of the motor are not shown but are permanently effected. With the arrangement as described, the field will be energized during stages A, B, C, D, G, H, I and J, but due to the fact that the conductors 130 and 131 are crossed, the direction of current flow through the field will be in one direction during stages A, B, C and D, causing rotation of the motor in one direction, and in the opposite direction during stages G, H, I and J, causing rotation of the motor in the opposite direction. It will be understood, of course, that the same result might be secured by making the connections between the source of current and the field terminals the permanent connections and by utilizing the described control mechanism for interrupting and for reversing the connections of the current source terminals to the armature.

In Figures 10 to 12 disclosure is made of a modified form of valve adapted to be used in place of the valve 16 for enabling openings of approximately double the angular width of those in the valve 16 to be employed. Due to the greater angular extent of their openings the valves of Figures 10 to 12 may be of smaller radius than valve 16 without imposing any objectionable limitation upon the rate at which the heat carrying gas may be circulated.

Referring to Figure 10, the valve 150 is mounted in a cylinder 151. This valve is intended for association with one of the retorts 6 to 10. An outer casing composed of semi-cylindrical sleeve members 152 and 153 is fixedly mounted in the cylinder 151. This outer sleeve is provided with an opening at the level of each of the flues of about 120 degrees in extent the openings being in vertical alignment. An intermediate sleeve member 154 adapted to be rotated in one direction, say counter-clockwise, is mounted within the outer sleeve 152—153, and an inner sleeve 155 adapted to be rotated in the opposite direction (clockwise) is mounted within the intermediate sleeve.

Provision is made of gearing for driving the sleeves 155 and 154 in opposite directions. The mechanism for effecting such rotation consists of a motor and control mechanism therefor identical with the disclosure of Figure 9, which motor is connected to drive a shaft 156 having a pinion 157 fast thereon. The pinion 157 is constantly in mesh with a pinion 158, fast on a shaft 159 which in turn is made fast to the inner sleeve 155 by webs 160. The pinion 157 is also constantly in mesh with a pinion 161 fast on a stub shaft 162. A pinion 163 also fast on the stub shaft 162 drives a pinion 164 loose on shaft 164a and pinion 164 in turn drives a pinion 164b to rotate a gear 165 fast on a sleeve 166 in the opposite direction from that in which pinion 158 is driven. The sleeve 166 is connected to drive valve sleeve 154 through webs 167.

The control mechanism being the same as that illustrated in Figure 9, a suitable arrangement of valve openings for producing the desired communications in the desired sequence will be with openings located in the sectors and at the levels indicated in the list below. In the list, each sleeve is regarded as divided in six sectors of 60° each and the sectors of each sleeve are numbered consecutively as they occur in clockwise sequence.

Sector Number

|  | I | II | III | IV | V | VI |
|---|---|---|---|---|---|---|
| Outer sleeve | A J | A GB | HC GB | HC ID | EF ID | EF J |
| Inner sleeve | A GB | A J | EF J | EF ID | HC ID | HC GB |

In the above table sectors I and II of both the inner and outer sleeves may be regarded as in alignment with the 120 degree opening in casing section 152, sectors I being regarded as in position 1 and sectors II being regarded as in position 2. This positioning of the sleeves is appropriate for stage A and represent a full 120 degrees opening to the flues at the appropriate levels for stage A. The other openings of the inner and outer sleeves located in these sectors are ineffective at this time because openings at corresponding levels are not in registration, that is openings at the same level do not simultaneously occupy position 1 or position 2.

With the above arrangement of sleeve openings and with the control mechanism of Figure 9 causing the sleeves to rotate equally in opposite directions, that is, the outer sleeve counter-clockwise and the inner sleeve clockwise, the operation will be as follows and will result in bringing the sleeve openings indicated in the following table into the position indicated in the sequence listed:

| End of stage | Rotation | Outer sleeve | | Inner sleeve | |
|---|---|---|---|---|---|
| | | Pos. 1 | Pos. 2 | Pos. 1 | Pos. 2 |
| A | 60° to | A GB | HC GB | HC GB | A GB |
| B | 60° to | HC GB | HC ID | HC ID | HC GB |
| C | 60° to | HC ID | EF ID | EF ID | HC ID |
| D | 60° to | EF ID | EF J | EF J | EF ID |
| E | 0° to | EF ID | EF J | EF J | EF ID |
| F | 180° to | A GB | HC GB | HC GB | A GB |
| G | 60° to | HC GB | HC ID | HC ID | HC GB |
| H | 60° to | HC ID | EF ID | EF ID | HC ID |
| I | 120° to | EF J | A J | A J | EF J |
| J | 60° to | A J | A GB | A GB | A J |

It is evident from an inspection of the above analysis of operations that 120° openings will be provided at all stages except E and F, at which no opening occurs, and that at no time will any flue be in communication with the inner sleeve of the valve except at the level appropriate to the stage in the cycle which has been reached.

The mechanism might be constructed to enable every chamber to be connected with every one of the other chambers, if desired, by employing valves like valves 16 or like valves 150 in place of the valves 15 associated with chambers 1 to 5 inclusive.

Figure 14:
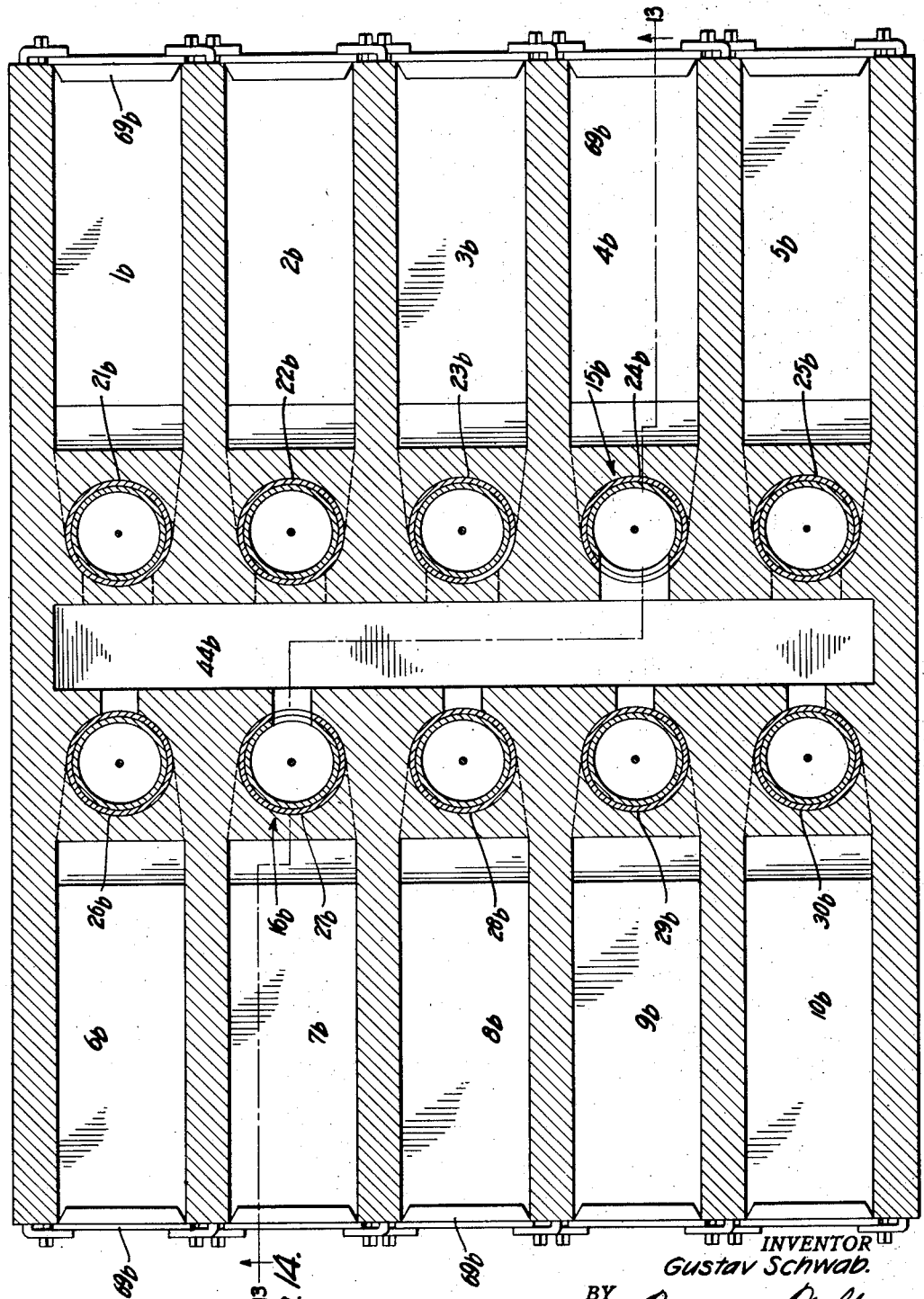
Figure 14 is a horizontal section through the apparatus of Fig. 13, taken on the line 14—14 of Fig. 13.

In Figs. 13 and 14 disclosure is made of apparatus similar to that of Figs. 1 to 9 inclusive, but differing in the fact that the chambers or retorts are provided with side doors 69b, instead of the covers 69 of Fig. 2, through which the work is introduced into and discharged from the chambers. In all other respects the apparatus disclosed is essentially the same as that of Figures 1 and 2. Corresponding parts have accordingly been designated by corresponding reference numerals with the subscript $b$ after each. No detailed description is therefore deemed necessary.

Figure 15:
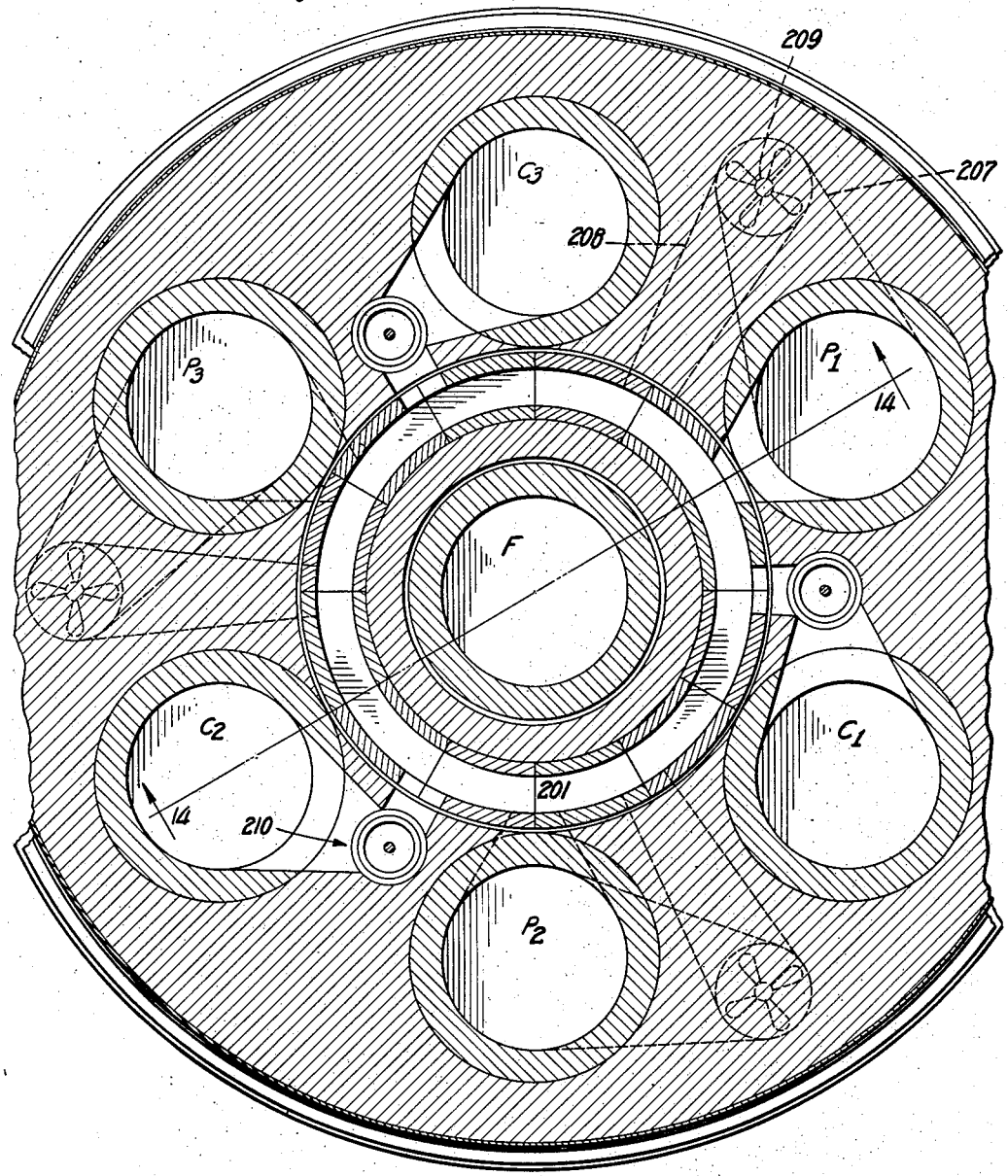
Figure 15 is a horizontal section through a further modified form of apparatus.

In Figs. 15 and 16 disclosure is made of a further modified form of apparatus adapted to be loaded and discharged from below and involving a somewhat different principle and cycle of operations.

In this form of apparatus the work is subjected to three preheating stages and is then transferred to a furnace for final heating. After being heated in the furnace, the work is transferred to a cooling chamber and passes through three successive stages of cooling in each of which it gives off heat to a charge in one of the preheating chambers. The apparatus comprises a furnace, three preheating chambers and three cooling chambers, although the number of preheating and cooling chambers may obviously be varied without departing from the principle of the invention. The preheating chambers are designated P1, P2 and P3. The three cooling chambers are designated C1, C2, and C3. The cooling and preheating chambers are arranged around the centrally located furnace chamber F. Assuming that the apparatus is in continuous operation, when the end of an operating period is reached the charge in the chamber which has just finished the third cooling stage is withdrawn and the charge from the furnace is transferred to the chamber thus vacated. The charge from the chamber which has just finished the third preheating stage is then transferred to the furnace and a fresh charge is introduced into the preheating chamber thus vacated. It will thus be seen that a three stage cycle is carried out, and that the connections necessary to be effected for causing heat interchange between the chambers at the first preheating stage and the third cooling stage, the second preheating stage and the second cooling stage, and the third preheating stage and the first cooling stage respectively require that each preheating chamber be adapted for connection with each cooling chamber. To this end provision is made of a series of circular flues 201, 202, 203, 204, 205 and 206. Chamber P1 is permanently connected with flues 201 and 206, chamber P2 is permanently connected with flues 202 and 205, and chamber P3 is permanently connected with flues 203 and 204. Each of chambers P1, P2 and P3 is connected with the lower one of its associated pair of flues through passages 207 and 208, and a blower 209 is located at the junction of these passages for facilitating the circulation of the air or other gaseous medium.

Chambers C1, C2 and C3 have their communication with the flues controlled by cylindrical rotary valves 210 adapted to be rotated to establish the appropriate flue connections in the several cycles.

As has been stated, the chambers in this form of apparatus are charged and discharged from below. For this purpose a transfer larry provided with elevator mechanism is employed. The work is supported upon combined closure and support 211, which is normally retained in place by locking rails 212 that interfit with angle brackets 213 to the outer side of the closure 211. At the conclusion of a stage of operation, the larry is moved beneath the cooling chamber to be discharged and the lifting mechanism is elevated into position to support the closure 211 of that chamber. The locking rails 212 are then withdrawn and the charge is lowered and removed. In similar fashion the charge is then transferred from the furnace chamber to the chamber just vacated and the charge which has just undergone the third preheating stage is transferred to the furnace chamber. A new charge is then loaded into the preheating chamber thus vacated and treatment of the work is continued.

I claim:

1. A heat exchange apparatus comprising a multiplicity of stationary retorts and means for connecting any two of the retorts selectively in exclusive communicating heat exchanging relation with one another.

2. In a heat exchange apparatus, in combination, a multiplicity of stationary retorts, means for causing heat to be transferred at distinct operations to each one of the retorts from first one and then another of a plurality of the other retorts, individually, to heat it by successive stages, and means for supplying additional heat to each of the retorts independently of the others.

3. An apparatus for heating charges of work material in successive stages and cooling the charges in successive stages comprising a multiplicity of stationary retorts and means operable for providing simultaneously heat interchanging connections between various pairs of retorts to the exclusion of all others, such that the charge in the first cooling exchange stage heats the charge in the last preheating stage, the charge in the second cooling exchange stage heats the charge in the next to the last pre-heating stage and so on.

4. An apparatus for heating charges of work material in successive stages and cooling the charges in successive stages comprising a multiplicity of stationary retorts, means for effecting simultaneous combinations of retorts in pairs to connect the retorts of a pair to the exclusion of all others for heat interchange, and means for supplying heat from an extraneous source to each of the retorts so that each charge may be subjected to the complete cycle of heating and cooling without shifting it from one retort to another.

5. An apparatus for heating charges of work material in successive stages and cooling the charges in successive stages comprising a multiplicity of retorts arranged in two distinct groups, a series of paired flues, each pair associated with one of the retorts of the first group of retorts, means for effecting and discontinuing connection of each pair of flues with its associated retort of the first group, and means for connecting each pair of flues selectively with any one of the retorts of the second group.

6. In a heat exchange apparatus in combination, a multiplicity of retorts arranged in two distinct groups, and means for connecting each retort of the first group in exclusive, communicating heat interchanging relation with any one of the retorts of the second group.

7. In a heat exchange apparatus, in combination, a series of retorts, means for selectively pairing the retorts in communicating heat exchanging relation to one another, and means for automatically controlling the pairing of the retorts in predetermined sequence.

8. In a heat exchange apparatus, a series of retorts each of which is subjected to an identical cycle of heating and cooling treatment comprising a series of stages, and means for automatically pairing the preheating and cooling retorts in communicating relation for causing all of the retorts to be at different predetermined stages simultaneously and changing the pairings to cause all of them to be advanced a stage in the cycle simultaneously.

9. In a heat treating apparatus, a multiplicity of stationary retorts adapted to be selectively paired in exclusive heat interchanging communication with one another, means for introducing a reducing or other gas to serve as the heat interchanging medium, means for shutting off each retort from all of the others and means for introducing an inert gas into a shut off retort to displace the reducing or other gas and for causing the removal thereof prior to the opening of the retort.

10. In a heat exchange apparatus in combination, a multiplicity of retorts adapted to be paired selectively in exclusive heat interchanging relation with one another, means forming channels of communication between the retorts, and rotary sleeve valves for controlling said channels.

11. In a heat exchange apparatus, in combination, a series of retorts, a sleeve valve extending parallel to each retort, and communicating with the top and bottom of the retort, said valve having a partition intermediate its ends dividing it into its discharge and intake chambers, conduits running from the valve for communicating with other retorts of the series, and means for rotating the valve to control the connecting and disconnecting of the valve and the conduits.

12. In a heat exchange apparatus in combination, a series of retorts and means for coupling the retorts selectively in pairs, comprising valves associated with certain of the retorts each of said valves comprising a pair of sleeves one within the other and means for rotating the inner and outer sleeves in opposite directions, step by step, each of the sleeves being provided with ports adapted to be rotated into and out of registration with one another, the ports being of substantially double the angular extent of the rotation imparted to each of the sleeves at a single step.

13. The method of heat treating work charges which involves subjecting each charge to a series of preheating steps, a final heating step, and a series of cooling steps, which consists in deriving the heat for each preheating step from a single one of the cooling charges by thermo-siphon action.

14. The method of heat treating charges of work while maintaining them stationary throughout the treatment, which involves subjecting each charge to a series of preheating steps, a final heating step, and a series of cooling steps, by deriving the heat for first preheating step solely from the charge undergoing the last cooling step, the heat for the second preheating step solely from the charge undergoing the next to the last cooling step, and so on.

15. The method of heat treating charges of work while maintaining the charges in fixed locations throughout the treatment, involving subjecting the charges to a series of preheating steps, a final heating step, and a series of cooling steps, which consists in treating as many charges simultaneously as there are steps in the treatment in such manner that one of the charges is always undergoing one of the steps of the treatment, while deriving the heat for the first preheating step solely from the charge undergoing the last cooling step, the heat for the second preheating step solely from the charge undergoing the next to the last cooling step, and so on.

16. The method of heat treating charges of work involving subjecting the charges to a series of preheating steps, a final heating step, a heat treating step such as carburizing or nitriding, and a series of cooling steps, which consists in treating as many charges simultaneously as there are steps in the treatment in such manner that one of the charges is always undergoing one of the steps of the treatment, while deriving the heat for the first preheating step by thermo-siphon action from the charge undergoing the last cooling step, the heat for the second preheating step by thermo-siphon action from the charge undergoing the next to the last cooling step, and so on.

17. In combination, a series of stationary heat interchange chambers and means for subjecting work charges in the chambers to a multiple stage heat-transferring cycle of heating and cooling steps while maintaining the charges in fixed locations throughout the treatment, the cycle being such that certain of the chambers are paired repeatedly in the course of the complete cycle to form when paired a closed thermo-siphon system, valve mechanisms operable to control the interconnection of the chambers, and means automatically effecting operations of the valves at predetermined times but to varying extents to effect the connections appropriate to the cycle.

18. In a heat treating apparatus including a series of chambers in each of which work is subjected to a multiple stage cycle of heat treatment, in combination, a rotary valve associated with one of the chambers for controlling communication of such chamber with other chambers at higher temperatures and at lower temperatures including the effecting of repeated connections with certain of the chambers, said valve having openings of greater angular extent than the quotient of 360° divided by the number of stages of the cycle, and means for driving the valve automatically step by step through steps of irregular extent aggregating a plurality of complete revolutions of the valve in each cycle so that certain of the valve openings are employed repeatedly in the cycle.

19. In combination, a valve having a multiplicity of operating positions, a motor for operating the valve, and means in the motor circuit for controlling operation of the motor, said motor controlling means comprising a clock operated control device and a control device operated by the valve motor, whereby operation of the valve is made subject both to a time factor and to the position of the valve to cause the valve to be moved to predetermined positions in predetermined sequence and at predetermined times.

20. In combination, a rotary valve adapted to be operated intermittently through variable distances but according to predetermined rule to effect a definite cycle of connections, means for automatically controlling the extent of the various operations of the valve, and means for automatically controlling the time of such operations to cause the valve to be moved to predetermined positions in predetermined sequence and at predetermined times.

21. In a heat treating apparatus, in combination, a multiplicity of chambers in each of which the work is subjected to a series of preheating steps and a series of cooling heat-interchange steps, a blower associated with each chamber, means for automatically controlling the connection of the chambers in pairs so that the heat given off by a work charge at a cooling heat-interchange stage may be transferred to a work charge at a preheating stage and means for automatically reversing the operation of each blower at the beginning of the first preheating stage and at the beginning of the first cooling heat-interchange stage of the chamber with which the blower is associated, whereby the current set up by the blower is caused always to assist the current induced by thermosiphon action.

22. In a heat treating apparatus, in combination, a series of chambers arranged in opposed banks and each provided with a lateral outlet for the introduction and removal of work, flues disposed between the banks of chambers, and valve mechanism controlling the connection of the flues with the chambers to selectively establish communication between pairs of chambers located in opposite banks.

23. In combination, a central furnace chamber, a series of heat interchange chambers arranged around the furnace chamber, means for transferring work charges between the furnace chamber and the heat interchange chambers, and means for selectively effecting communication between pairs of the heat interchange chambers.

24. In combination, a central furnace chamber, a series of preheating chambers and cooling chambers arranged around the furnace chamber, and means for selectively effecting connections between the preheating and the cooling chambers for pairing the chambers to form of each pair a closed thermo-siphon circulatory system.

25. A heat exchange apparatus, comprising a multiplicity of chambers, means for connecting the chambers simultaneously in pairs, each connected pair forming a discrete circulatory system for heat interchange, in a cycle in which all of the chambers are used, and means for shutting off the chambers individually from the system so that a cycle employing only part of the chambers may be carried out.

26. In a heat exchange apparatus, a multiplicity of chambers, means for connecting pairs of chambers in heat interchange relation to the exclusion of the others, means for effecting appropriate connections to carry out in each chamber a cycle of operations having as many stages as there are chambers, and means, including valves settable to cut off the chambers individually for adapting the apparatus for use in a cycle involving a reduced number of stages.

27. In a heat exchange apparatus, in combination, a series of retorts, and means selectively providing a plurality of discrete circulatory systems, comprising means for placing the retorts impaired intercommunication with one another to cause heat exchange between the retorts of each pair by thermosiphon flow of a fluid medium between them, and means for controlling such thermosiphon flow of each system to increase or diminish the rate of flow induced by thermosiphon action.

28. A heat exchange apparatus comprising a multiplicity of stationary retorts and means for connecting any two of the retorts selectively in exclusive communicating, heat exchanging relation, and for similarly independently connecting any two of the other retorts.

29. In a heat exchange apparatus, in combination, a multiplicity of stationary retorts, means for causing heat to be transferred at distinct operations to each one of the retorts from first one and then another of a plurality of the other retorts, individually, to heat it by successive stages, and means for supplying additional heat to each of the retorts independently of the others, the arrangement being such that a plurality of retorts are coupled to receive heat from other retorts simultaneously, each being connected exclusively and independently of the others with a single heat supplying retort.

In testimony whereof I have affixed my signature to this specification.

GUSTAV SCHWAB.

CERTIFICATE OF CORRECTION.

Patent No. 1,890,431.  December 6, 1932.

GUSTAV SCHWAB.

It is hereby certified that error appears in the printed specification of the above numbered patent requiring correction as follows: Page 9, line 108, claim 18, for "of" second occurrence read "in"; page 10, line 77, claim 27, for the word "impaired" read "in paired"; and that the said Letters Patent should be read with these corrections therein that the same may conform to the record of the case in the Patent Office.

Signed and sealed this 28th day of February, A. D. 1933.

(Seal)

M. J. Moore,
Acting Commissioner of Patents.